United States Patent
Andonov et al.

[11] Patent Number: 5,928,603
[45] Date of Patent: Jul. 27, 1999

[54] DEVICE FOR SEALING A LANCE IN AN OPENING FOR INTRODUCTION OF THE LANCE INTO A CONTAINER UNDER PRESSURE

[75] Inventors: Radomir Andonov, Mamer; Emile Lonardi, Bascharage, both of Luxembourg

[73] Assignee: Paul Wurth S.A., Luxembourg

[21] Appl. No.: 08/929,680

[22] Filed: Sep. 15, 1997

Related U.S. Application Data

[63] Continuation of application No. PCT/EP96/01018, Mar. 9, 1996.

[30] Foreign Application Priority Data

Mar. 31, 1995 [LU] Luxembourg .................. LU-88600

[51] Int. Cl.⁶ .................................................. C21C 5/32
[52] U.S. Cl. .................... 266/225; 266/265; 266/269; 266/270
[58] Field of Search ............................. 266/225, 226, 266/265, 269, 270

[56] References Cited

U.S. PATENT DOCUMENTS

| | | |
|---|---|---|
| 2,273,129 | 2/1942 | Messinger . |
| 3,434,728 | 3/1969 | Soldato . |
| 4,465,265 | 8/1984 | Kryczun et al. ............... 266/226 |
| 4,908,179 | 3/1990 | Brookins . |
| 4,911,414 | 3/1990 | Bates et al. ................... 266/270 |
| 5,328,157 | 7/1994 | Mantey ........................ 266/265 |
| 5,462,260 | 10/1995 | Lonardi et al. . |

FOREIGN PATENT DOCUMENTS

| | | |
|---|---|---|
| A 1600190 | 7/1970 | France . |
| A1 425523 | 5/1969 | Germany . |
| A 2816930 | 10/1979 | Germany . |
| A 4415219 | 12/1994 | Germany . |
| WO A 95/02145 | 1/1995 | WIPO . |
| WO 96/30548 | 10/1996 | WIPO . |

OTHER PUBLICATIONS

International Preliminary Examination Report dated Mar. 11, 1997 (Form PCT/IPEA/409) in German.

*Primary Examiner*—Scott Kastler
*Attorney, Agent, or Firm*—Smith, Gambrell & Russell, LLP; Beveridge, DeGrandi, Weilacher & Young Intellectual Property Group

[57] ABSTRACT

A device for sealing a lance (12) in an opening in a container under pressure, in particular a shaft furnace, is described. The device comprises a first casing (46) with an end wall on the shaft furnace side and on the environment side, which are each provided axially with an opening for a lance (12), and a sealing element (14), which is arranged in the first casing (46). The sealing element (14) comprises at least one packing (50) and at least one axially movable annular piston (52), which are arranged coaxially with an axis (24) of the device, the packing (50) being arranged between the piston (52) and one of the end walls of the first casing (46) in the actuating direction of the piston (52). The packing (50) is pressed axially against one of the end walls of the casing (46) by actuation of the piston (52), the packing (50) extending radially and being laid around the lance (12) to form a seal.

20 Claims, 8 Drawing Sheets

DEVICE FOR SEALING A LANCE IN AN OPENING FOR INTRODUCTION OF THE LANCE INTO A CONTAINER UNDER PRESSURE

This is a continuation application of PCT Application No. PCT/EP96/01018 having an international filing date of Mar. 9, 1996.

This invention relates to a device for sealing a lance in an opening for introduction of the lance into a container under pressure, in particular a shaft furnace.

To enable measurement of the gas concentrations in a shaft furnace it is already known how to introduce a lance with a measuring probe through a lateral hole into the shaft furnace. As an overpressure prevails inside the furnace, this hole must be sealed against the lance to prevent outflow of the gases in part injurious to health.

Sealing devices, which enable introduction and withdrawal of the lance and at the same time prevent outflow of the gases from the shaft furnace, are provided for this purpose.

Plastically deformable packings, which are arranged in a tight casing and rest tightly against the lance to be introduced with the result that a seal against the casing is achieved, are the simplest form of sealing device. However, the cross-section of the lance is subject to relatively marked fluctuations. These changes in the lance cross-section may result on the one hand from deposits or wear, with the result that the cross-section is increased or reduced, while on the other hand operating temperature fluctuations and the associated thermal expansion or contraction cause changes in the lance cross-section. However, the effect of these changes is that the plastic packings no longer rest tightly against the lance relatively quickly with the result that the sealing property is lost.

DE-A-29 50 672 discloses a sealing device having an elastic tubular seal, which can be pressed down, joined to the seal and resting on the lance. This elastic seal is subjected to pressure when the lance is introduced with the result that it fits even more tightly around the lance and thus increases the tightness. As the tubular seal rests continuously against the lance the stressing of the material by friction when the lance is introduced and withdrawn is considerable, which leads to rapid wear and destruction of the tubular seal and the associated loss of sealing function.

As the elasticity of the seal must be ensured, the wear cannot be prevented even by reinforcing or coating the friction surface. In other words it is not possible to increase the wall thickness at will, as is customary with plastic seals, or coat the friction surface with a wear-resistant material, because this generally does not have a high elasticity.

To avoid this disadvantage of the attached elastic seal the patent specification DE-A-44 15 219 and DE-A-44 15 221 disclose a sealing device, which comprises an elastic inflatable seal, which is pressurised so that it fits tightly against the lance when the latter has already been introduced, but is retracted so far during insertion and withdrawal of the lance that it no longer rests against the latter. To ensure the tightness during introduction or withdrawal of the lance, however, several annular seals, e.g. flexible seals or packings, which rest continuously against the lance, are provided. Whereas the disadvantage of rapid wear of the elastic material is eliminated in this sealing device, a new problem arises. As the inflatable, elastic seal no longer rests against the lance when the latter is moved, it is no longer possible to compensate in this phase for radial play caused by the changes in the lance cross-section.

Furthermore, various sealing devices, which can be used to seal shafts or journals in a casing, have been described. FR-A1,600,190 describes, for example, a sealing device for a journal with inflatable seal, which rests tightly against the journal when pressurized. The inflatable seal is arranged in a ring in a radial chamber in a casing, the ring being movable radially in the latter in such a way that radial displacements between the journal and the casing can be compensated. However, this device again has the disadvantage of the rapidly wearing tubular seal already described above.

DE-A-14 25 523 discloses a sealing device for rotating shafts, in which two flexible packings are arranged around the shaft inside a casing, the packings being held in their axial position by an open cage construction under spring tension or by a shell made from an easily deformable material. The flexible packings are forced in a radial direction against the sealing face of the shaft by admission of a pressure medium to the casing and the contact pressure on the shaft is increased. U.S. Pat. No. 2,273,129 describes a seal for an anti-friction bearing, in which two sealing rings with a U-shaped cross-section rest against the shaft in a casing coaxial with a shaft, the legs of the U section each forming a sealing lip. The seals are axially spaced in such a way that the recesses in the U-shaped cross-sections are axially opposite each other, so that the recesses terminate in a pressure space formed between the seals. Admission of a pressure medium to the pressure space forces the two sealing lips of each seal radially apart, so that the sealing lip resting on the shaft fits more closely to the latter. U.S. Pat. No. 3,434,728 describes a device for sealing a shaft bushing into a pressure space with a casing integrated with the latter, the casing extending coaxially with the shaft outside the pressure space. Packings, which are each pressed by a sleeve-type piston against the corresponding end face of the casing, are arranged around the shaft at each end face of the casing inside the latter. However, these devices are not suitable to compensate for radial displacements between a lance and the axis of a bushing.

Consequently the present invention is based on the task of providing a device for sealing lance on entry into a container under pressure, which can compensate both for radial play as a result of changes in the lance cross-section and also displacements of the lance axis with regard to the bushing axis without jeopardising the tightness of the device due to excessively rapid wear.

According to the invention this problem is solved by a device for sealing a lance in an opening for leading the lance into a container under pressure, in particular a shaft furnace, which comprises an outer casing with an end wall on the shaft furnace side and on the environment side, which are provided axially with an opening for a lance, and a sealing element arranged in the outer casing, and which is characterised by the fact that the sealing element comprises an inner casing with axial end walls provided with an opening for the lance as well as at least one packing and at least one axially movable annular piston, which are arranged inside the inner casing coaxially with an axis of the inner casing, that the packing is arranged between the piston and one of the end walls of the inner casing in the actuating direction of the piston, that the packing can be compressed axially against one of the end walls of the inner casing by actuation of the piston whereby the packing extends radially and forms a seal around a lance which is being led through, and that the inner casing is radially movable in the outer casing, as that the inner casing together with the packing and the piston is self-centering on a lance led into a container. The negative effects of the wear on the seal arrangement can be significantly reduced by using a packing, i.e. a plastic seal, as sealing element. In reality the problem of maintaining their elasticity is not encountered with plastic seals. Hence with this packing the material thickness can be increased and the friction surface coated with a wear-resistant material without any adverse effect on the sealing properties.

It should be noted that the term packing is used as a generic term here. It is obvious to the expert that a packing as used in the present invention may also consist of several packing rings arranged axially next to each other. In this case the individual packing rings are pressed against each other on actuation of the piston, a first packing ring being supported by one of the end walls, whereas a second packing ring rests directly against the piston and transfers the piston pressure to the interposed packing rings.

As the packing can be compressed by a piston, a feature of the device according to the invention is that the seal can be adapted to variations in the lance cross-section. In addition the actuation of the piston can be discontinued for movement of the lance in the device. Consequently the tight fit of the packing around the lance is loosened and the latter can be moved with less frictional resistance.

Furthermore, according to the internal pressure in the container, the tightness of the entire device can be adapted to the conditions in the container by stronger or weaker actuation of the piston. In other words the required greater tightness of the sealing devices, e.g. in the case of a pressure increase in the container, can be achieved by stronger actuation of the piston.

The possibility or radial displacement of the inner casing in the second casing enables it to adapt to an inclined or axially displaced position of the lance in the sealing device. Hence the inner casing can be freely centered on the lance, if the latter is introduced at an angle or with axial displacement into the sealing device.

In a preferred embodiment the sealing element comprises two pistons and two packings, which are arranged coaxially with the axis of the device, the two pistons being arranged axially between the two packings, so that they act in opposite directions when actuated and each of the packings can be compressed by a piston against one of the end walls of the inner casing.

The stress on the individual packing can be reduced by the use of several packings. In addition an adequate sealing effect of the device is achieved with a weaker actuation of the pistons.

To facilitate the introduction and withdrawal of the lance and to reduce the wear on the seals it is advantageous to install an elastic element within the at least one packing, concentrically with the axis of the device, which is enclosed by the packing and at least partially reverses the axial deformation of the packing when the piston is not actuated.

On reduction of the piston pressure on the packing the elastic element endeavours to reassume its original shape. If the piston is no longer actuated, the potential energy stored in the elastic element during compression of the packing by the pistons is released and the packing is extended axially. This is associated with a radial contraction with the result that the close fit of the packing around the lance is loosened.

To ensure the tightness of the entire device the inner casing is advantageously sealed against the end walls of the outer casing with annular flexible seals which are attached to the end walls of the inner casing.

An embodiment in which two pistons are arranged in such a way that an annular pressure chamber is formed between the two pistons, is particularly advantageous. If each of the pistons is sealed with an inner annular seal radially inwards against a guide sleeve, which is mounted coaxially with the axis, and with an outer annular seal radially outwards against the inner surface of the inner casing, the annular pressure chamber is sealed axially and the two pistons can be actuated simultaneously by admission of a pressure medium to the pressure chamber.

This saves separate feed lines for the pressure medium to the two pistons as well as expensive control of the pressurisation.

In a further embodiment an elastic seal, which seals the pressure chamber outwards, is arranged in the pressure chamber.

In this embodiment the annular seals, with which each of the pistons is sealed radially inwards against the guide sleeve and radially outwards against the inner surface of the first casing, can be dispensed with.

To ensure a certain continuous pre-tension of the packings and thus a certain tightness, elastic means, which can actuate the pistons, can optionally be arranged between the pistons in the pressure chamber. These elastic means may comprise, for example, a spiral spring. This spring presses the pistons against the packings with a certain force even if the pressure chamber is not under pressure. It should be noted that the spring force of the spring should be smaller than the spring force of the elastic means in the packings, because otherwise the deformation of the packing cannot be reversed (even partially).

In a further variant of the embodiment radially movable, wedge-shaped elements, which can actuate the pistons, are arranged between the pistons. These wedge-shaped elements can then be moved radially inwards, e.g. by admission of a pressure medium to a chamber between the first and second casing.

Elastic means, e.g. a pretensioned spiral spring ring or a pretensioned ring made from elastic plastic, which exerts a force directed radially inwards on the wedge-shaped elements, can also optionally be arranged around the latter.

Elastic means, which rest radially inwards on the guide sleeve and press radially outwards against the wedge-shaped elements, can be arranged between the guide sleeve and wedge-shaped elements as restoring element for the latter.

It is advantageous for all embodiment variants to coat the supporting surfaces, with which the inner casing rests on the lance, with a material, which reduces the frictional resistance of the supporting surfaces on the lance.

Consequently the wear on these parts is, of course, reduced, thereby substantially prolonging the life of the sealing device.

Various embodiments of the device according to the invention are described below with reference to the figures.

Figure 1:
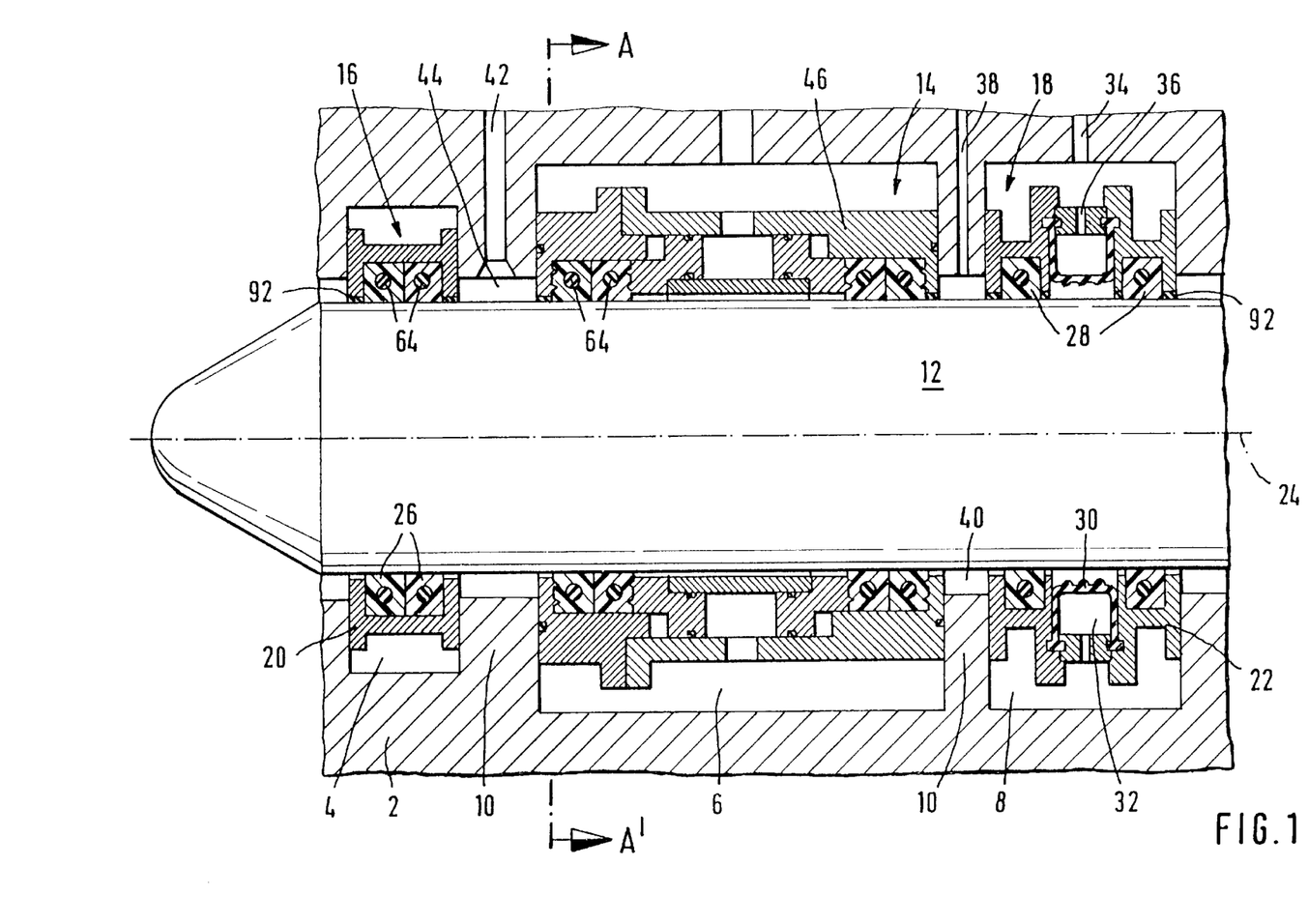
FIG. 1 shows a section through the axis of a first embodiment of a device for sealing a lance, FIG. 2 the central part of the device according to FIG. 1 in an enlarged section, FIG. 3–FIG. 7 sections through the central parts of different sealing devices, FIG. 8 a cross-section along the line A–A' at right angles to the axis through the sealing device in FIG. 1.

FIG. 1 shows a section through an embodiment of a sealing device. It comprises an outer casing 2, which is divided in its interior into several chambers 4–8, which are separated by ribs 10 in the axial direction and in which the individual sealing elements are arranged. The casing 2 and ribs 10 are provided with an opening for a lance 12 axially in the centre, the width of the opening being dimensioned in such a way that the lance 12 has a relatively large radial play in the opening.

The device in FIG. 1 comprises a further two sealing elements 16, 18 in chambers 4 and 8, in addition to a central sealing element 14, which is mounted in the central chamber 6. These may be of the type described in DE-A-44 15 219 and DE-A-44 15 221. They comprise rings 20, 22, the inside cross-section of which is adapted to the cross-section of the lance 12. Each of these rings 20 or 22 is mounted in such a way in its chamber 4 or 8 that it can be moved at right angles to the central axis 24 of the sealing device. This possibility of moving the rings 20, 22 in their respective chamber 4, 8 of the casing 2 enables the rings 20, 22 to be adapted to an inclined or axially displaced position of the lance 12 in the sealing device. Hence the rings with the sealing elements can centre freely on the lance 12, if the lance is introduced through the sealing device at an angle or axially displaced.

The rings 20, 22 constitute holders for packings or seals, which rest on the lance 12. For example, the ring 20 is provided on the inside with a packing consisting of two packing rings 26, via which it rests on the lance 12. The ring 22 has an inflatable seal 30, which is accommodated in a hollow space 32 in ring 22. In the uninflated position this inflatable seal 30 is retracted into its hollow space 32; this enables the lance 12 to move without damage or wear to the inflatable seal 30. In the inflated position, the inflatable seal 30 can, however, compensate for substantially larger radial play than the two packing rings 26 of the sealing element 16. The ring 22 advantageously lies on the lance 12 via two packings 28, which are arranged on both sides of the hollow space 32. To apply pressure to the inflatable seal 30 pressure is advantageously fed to the chamber 8. This is done, e.g. by supplying a pressure medium to the chamber via a supply opening 34. The chamber 8 is connected via openings 36 in the ring 22 to the hollow space 30, with the result that the pressure medium enters the inflatable seal 30. Finally, it should be noted that the inflatable seal 30 can be inflated by a liquid under pressure or a gas under pressure.

Viewed in the direction of introduction of the lance 12 an inlet opening 38 for lubricant is provided in the rib 10 of casing 2 behind the chamber 8. Consequently lubricant enters the annular hollow space 40, which is limited axially on the environment side by the ring 22 and on the shaft furnace side by the central sealing element 14 and is enclosed radially on the inside by the lance 12 and on the outside by the rib 10. The lubricant serves both to lubricate the packings with the result that their wear is reduced during movement of the lance and also to coat the lance with an anti-corrosion film.

An inlet opening 42 for sealing gas is provided in front of the sealing element 16 in the direction of introduction. Sealing air at high pressure can be blown into the hollow space 44 through this opening 42. If the pressure in the hollow space 44 is greater than the pressure in the shaft furnace gases harmful to health such as carbon monoxide are prevented from escaping from the shaft furnace in the event of a leak in the sealing element 16.

Figure 2:
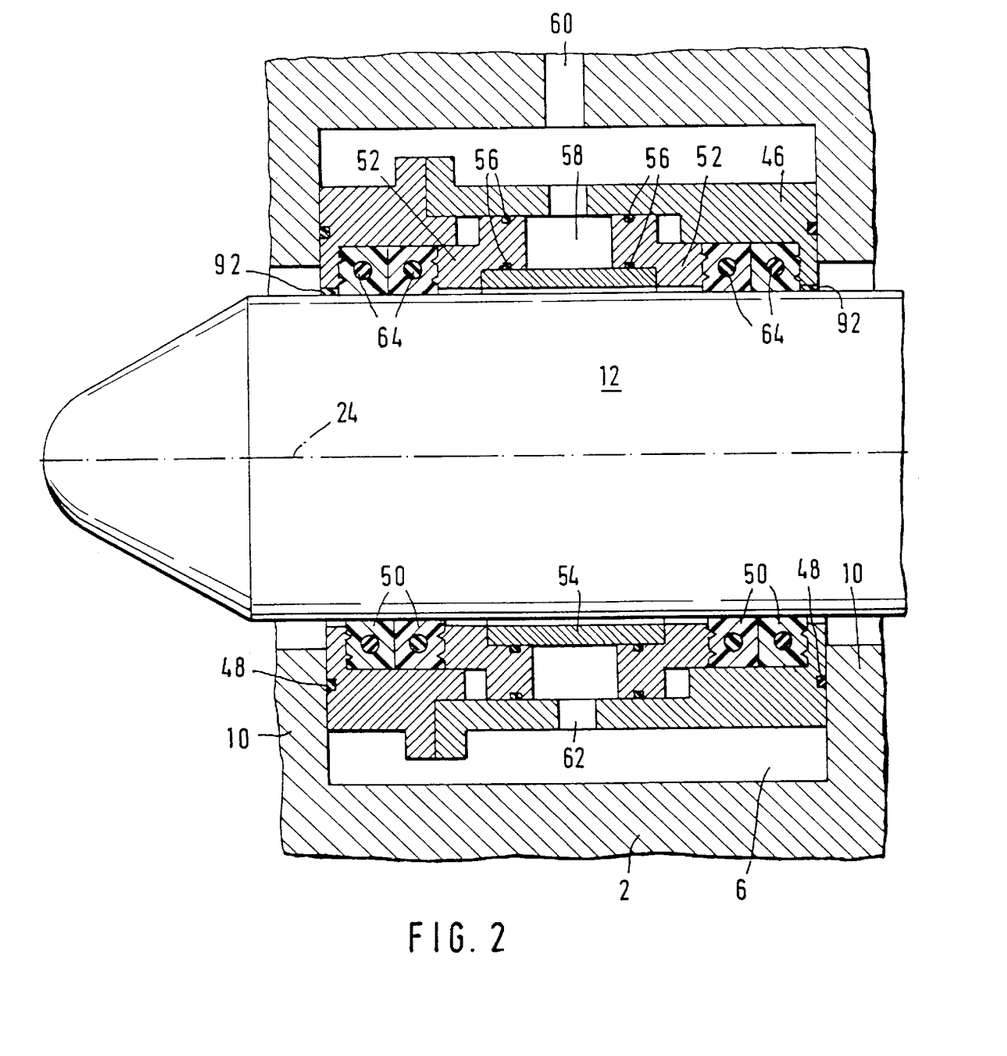

The central sealing element 14 is shown in enlarged form in FIG. 2. It comprises an inner casing 46 with an end wall on the shaft furnace side and on the environment side, which are provided with an opening for a lance 12. This inner casing is mounted in the central chamber 6 of the outer casing 2 in such a way that it can be moved at right angle to the central axis 24 of the sealing device. This possibility of displacement of the inner casing 46 in the chamber 6 of casing 2 enables free centering of the inner casing 46 on the lance 12, as in the case of rings 20, 22, if the lance is introduced at an angle or with axial displacement through the sealing device.

At its two end walls the inner casing 46 is sealed axially against the ribs 10 of the outer casing 2 with annular seals 48, which are seated in a groove cut into the front sides coaxially with the axis 24. Inside the casing 46 a packing 50 consisting of two packing rings is arranged coaxially with the axis 24 both on the shaft furnace side and on the environment side. These packings 50 preferably rest against the respective end wall of the inner casing 46. They are dimensioned in such a way that they rest on the lance 12, if the latter is pushed into the sealing device. To increase the tightness still further when the lance 12 is introduced, two annular pistons 52 are provided in the casing 46. These annular pistons 52 are guided radially outwards on the inner wall of the inner casing 46, whereas they are guided inwards by a guide sleeve 54, which is arranged coaxially with the axis 24 and its inside width is dimensioned in such a way that the lance has a certain radial play in the sleeve 54. The annular pistons are each sealed by two annular seals 56, e.g. O-rings or quad rings, radially against the inner casing 46 and the guide sleeve 54 with the result that a sealed pressure chamber 58 is formed between the pistons in an axial direction.

To actuate the pistons 52 simultaneously, the pressure chamber 58 is pressurised. This is preferably done by supplying a pressure medium via a supply opening 60 to the chamber 6 sealed by the annular seals 48. The chamber 6 is connected to the pressure chamber 58 via openings 62 in the casing 46 with the result that the pressure medium enters the pressure chamber 58. It should be noted that the admission of pressure to the pressure chamber 58 can be carried out by a liquid or gas under pressure.

The annular pistons 52 are axially movable, so that on actuation one of the piston is forced against the packing resting on the end-wall on the shaft-furnace side whereas the other piston is forced against the packing resting on the end wall on the environment side. The resulting axial pressure exerted forces the packings 50 against the respective end wall of the inner casing 46 and compresses them axially, whereby they extend radially. This causes the packings to fit more tightly against the lance 12 with the result that the tightness of the entire device is increased.

To withdraw the lance 12 from the device, the overpressure in the chamber 6 and the pressure chamber 58 is first reduced. Consequently the pressure exerted by the pistons 52 on the packings 50 is discontinued and the packings 50 can extend axially again with the result that the radial extension is partially reversed. To ensure that the packings 50 resume their original shape, each packing is provided with an elastic element 64 in its interior, which is mounted concentrically with the axis 24 of the device and is enclosed by the packing on its entire circumference. This elastic element 64, e.g. a rubber core, causes at least partial reversal of the axial deformation of the packing when the piston is not actuated. The packing 50 thus rests less tightly against the lance 12 with the result that the frictional resistance and thus also the wear is considerably reduced. The life of the packings 50 is thus in turn prolonged and they need not be replaced as frequently.

Figure 3:
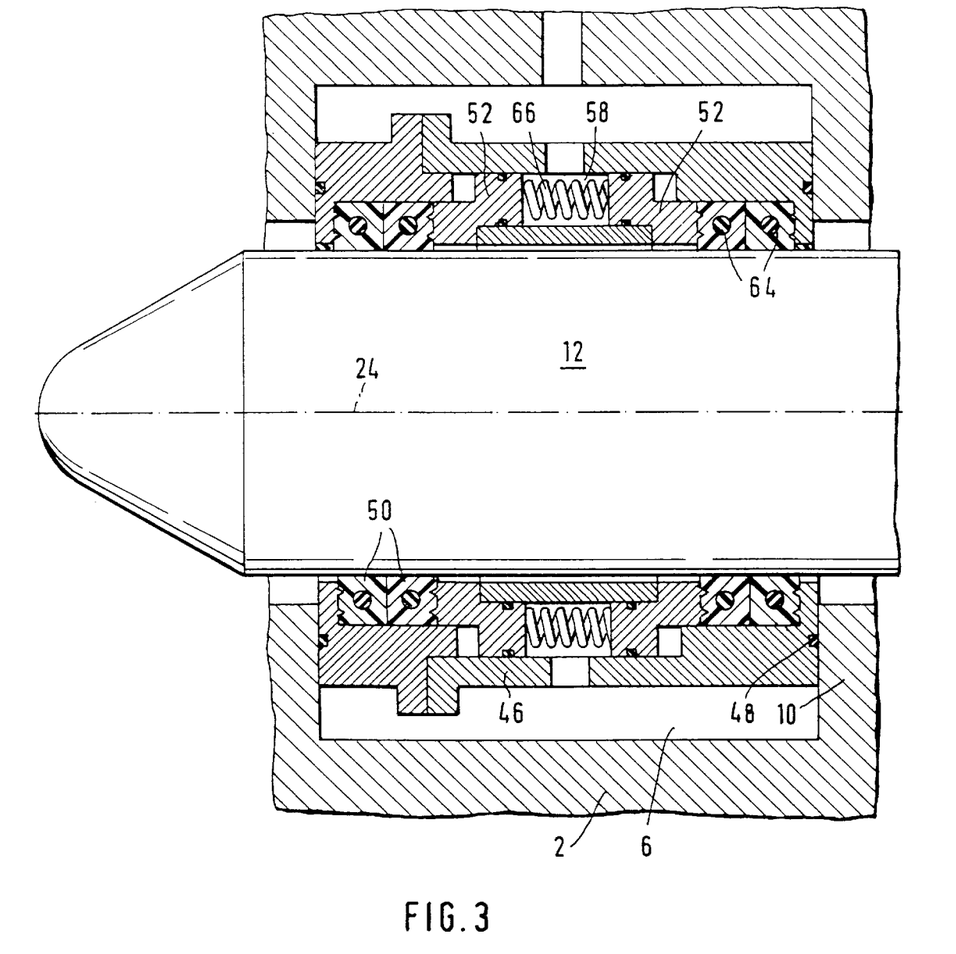

To ensure a certain continuous pretension of the packings and thus a certain tightness, an elastic means 66, e.g. a spiral spring, can be arranged optionally in the pressure chamber 58 between the two pistons 52. This is shown in FIG. 3.

This spring 66 presses the pistons against the packings with a certain force even if the pressure chamber 58 is not under pressure. It should be noted that the spring force of spring 66 should be smaller than the spring force of the elastic means 46 in the packings 50, because otherwise the deformation of the packings cannot be reversed (even partially).

Figure 4:
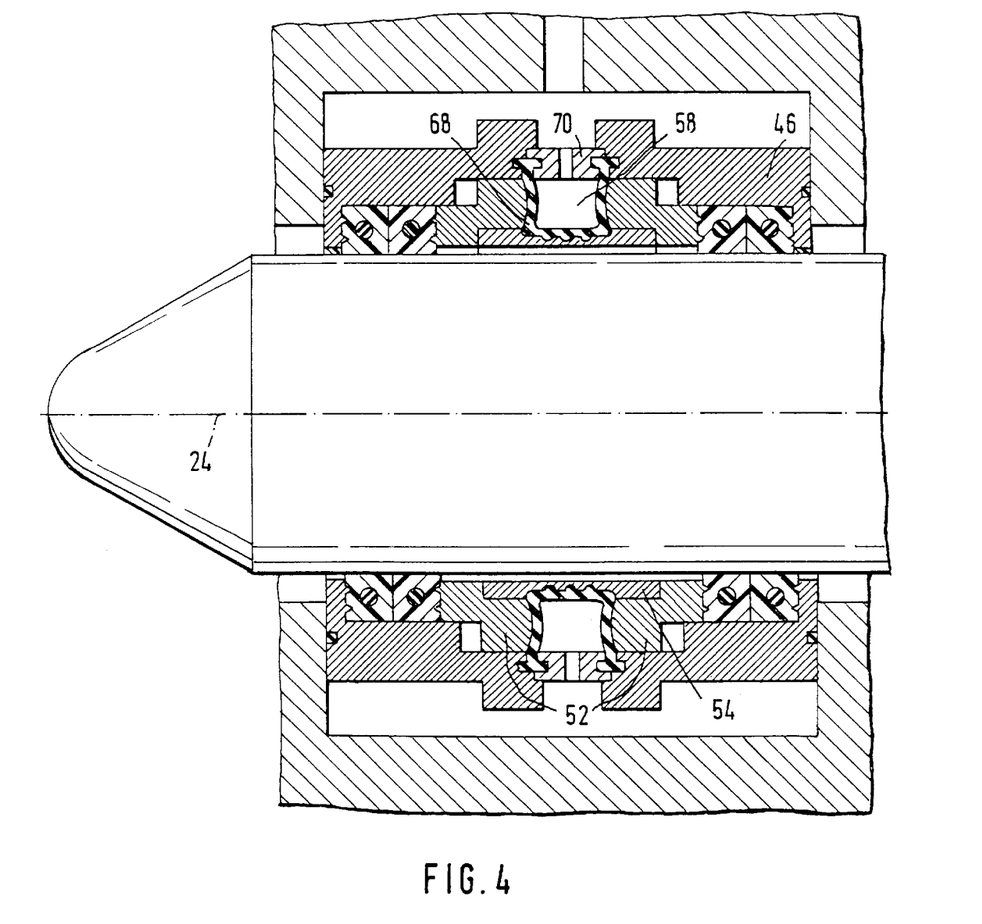

FIG. 4 shows a further variant of the sealing element 14. In this embodiment no annular seals 56 are used to seal the pressure chamber 58. Instead the entire pressure chamber 58 is lined with an elastic seal 68, which is clamped with an insert 70 in the inner casing 46. This seal 68 is likewise subjected to pressure as in the preceding exemplified embodiments. As the seal 68 is supported against the guide sleeve 54 radially towards the axis 24, it extends in an axial direction with the result that the two pistons 52 are again actuated simultaneously.

Figure 5:
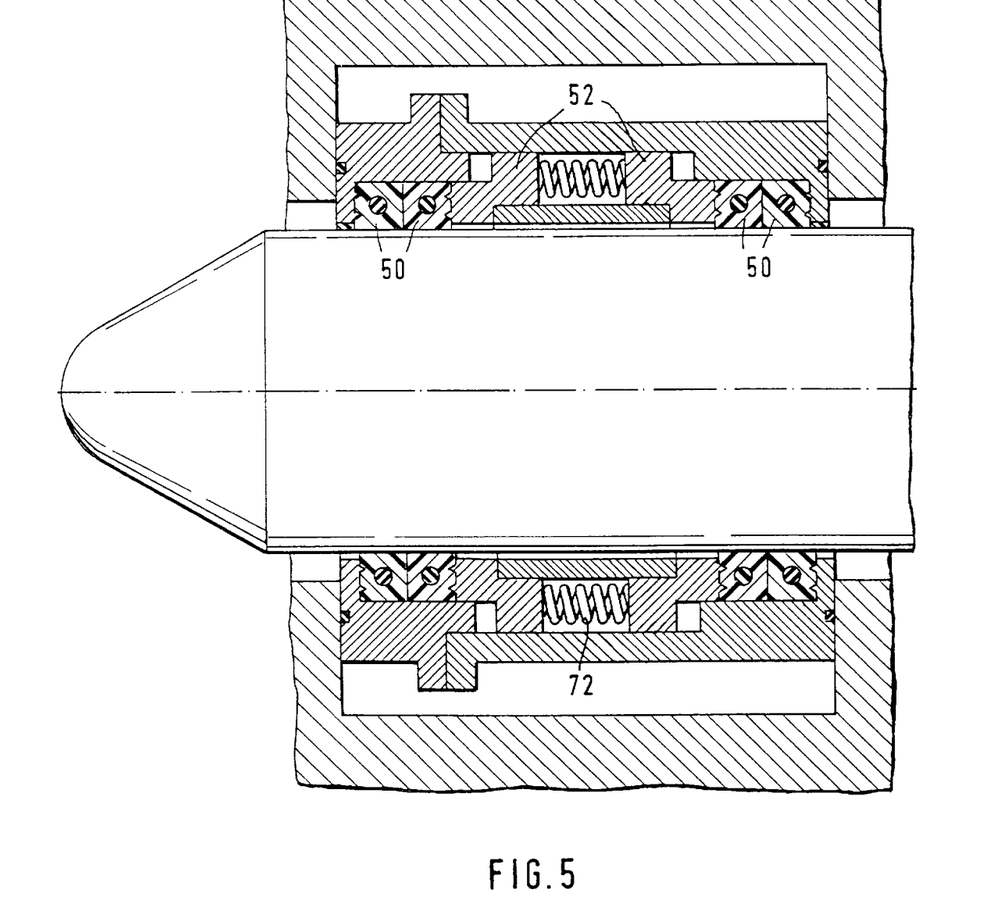

FIG. 5 shows a further possible embodiment of the sealing element 14. In this variant the two pistons 52 are actuated only by an elastic means 72. This advantageously comprises a spiral spring and is pretensioned in such a way that the spring force exerted is adequate to compress the packings 50 axially via the pistons 52. The sealing element thus automatically adapts to variations in the lance cross-section.

Figure 6:
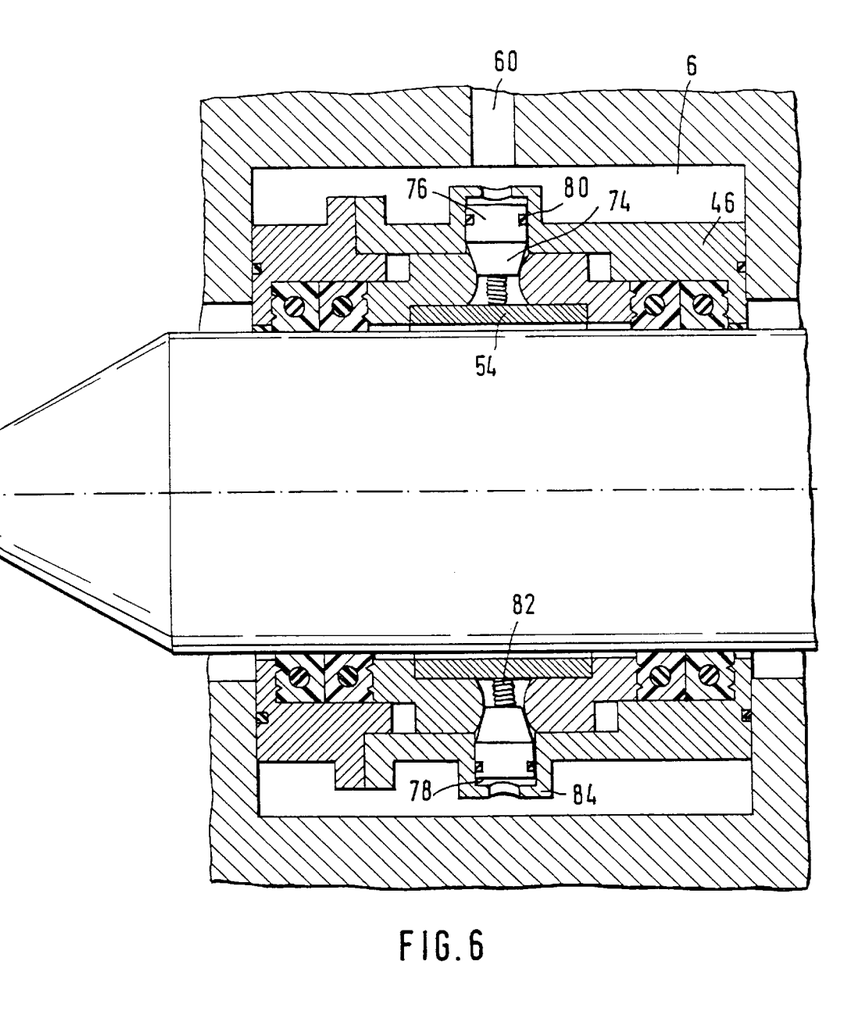

A further externally controllable variant is shown in FIG. 6. The two pistons 52 are actuated by wedge-shaped elements 74, which are mounted between the two pistons 52 in such a way that they force the two pistons 52 axially apart by radial displacement towards the axis. The actuating elements 74 have a part 76 facing radially outwards with lateral faces parallel with each other. The elements 74 are guided by these lateral faces in a guide opening 78 in the inner casing 46 and sealed against them by flexible seals 80.

The wedge-shaped elements 74 are actuated by admission of pressure to chamber 6 via the inlet opening 60. The overpressure building up in the chamber acts on the outer lateral face of the wedge-shaped elements 74 and exerts on them a force directed radially inwards. When the overpressure is discharged from the chamber 6 the elements 74 are again pushed radially outwards by elastic means 82. These elastic means 82 advantageously comprise a spiral spring, which is supported radially inwards on the guide sleeve 54, and presses radially outwards against the inner surface of the actuating element 74. To prevent the actuating elements 74 being pushed radially outwards from the guide openings 78 by the spring 82 when the chamber 6 is pressureless, stops 84 are provided on the outside of the guide openings 78.

Figure 7:
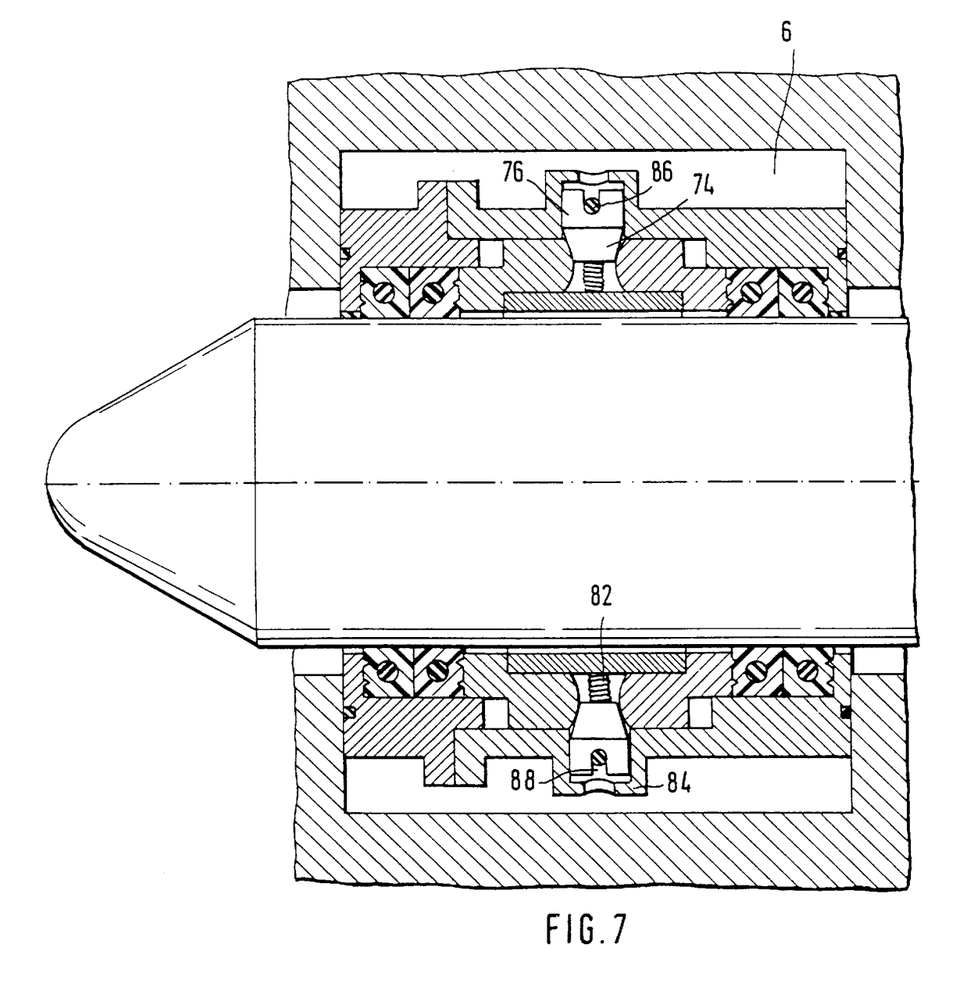

A further variant, which adapts automatically to changes in cross-section, is based on the embodiment in FIG. 6. This is shown in FIG. 7. In this case the wedge-shaped elements 74 are no longer actuated by admission of pressure to chamber 6, but by an elastic element 86, which is laid around the outside of the wedge-shaped actuating elements 74. This elastic element 86 may for example, be a spiral spring ring or a ring made from an elastic plastic, which is fitted pretensioned in an annular groove 88, which is cut coaxially with the axis into the parts 76 of the actuating elements 74 radially inwards from the outer lateral face. It should be noted that in this variant the flexible seals 80 are unnecessary just like the inlet opening 60.

Figure 8:
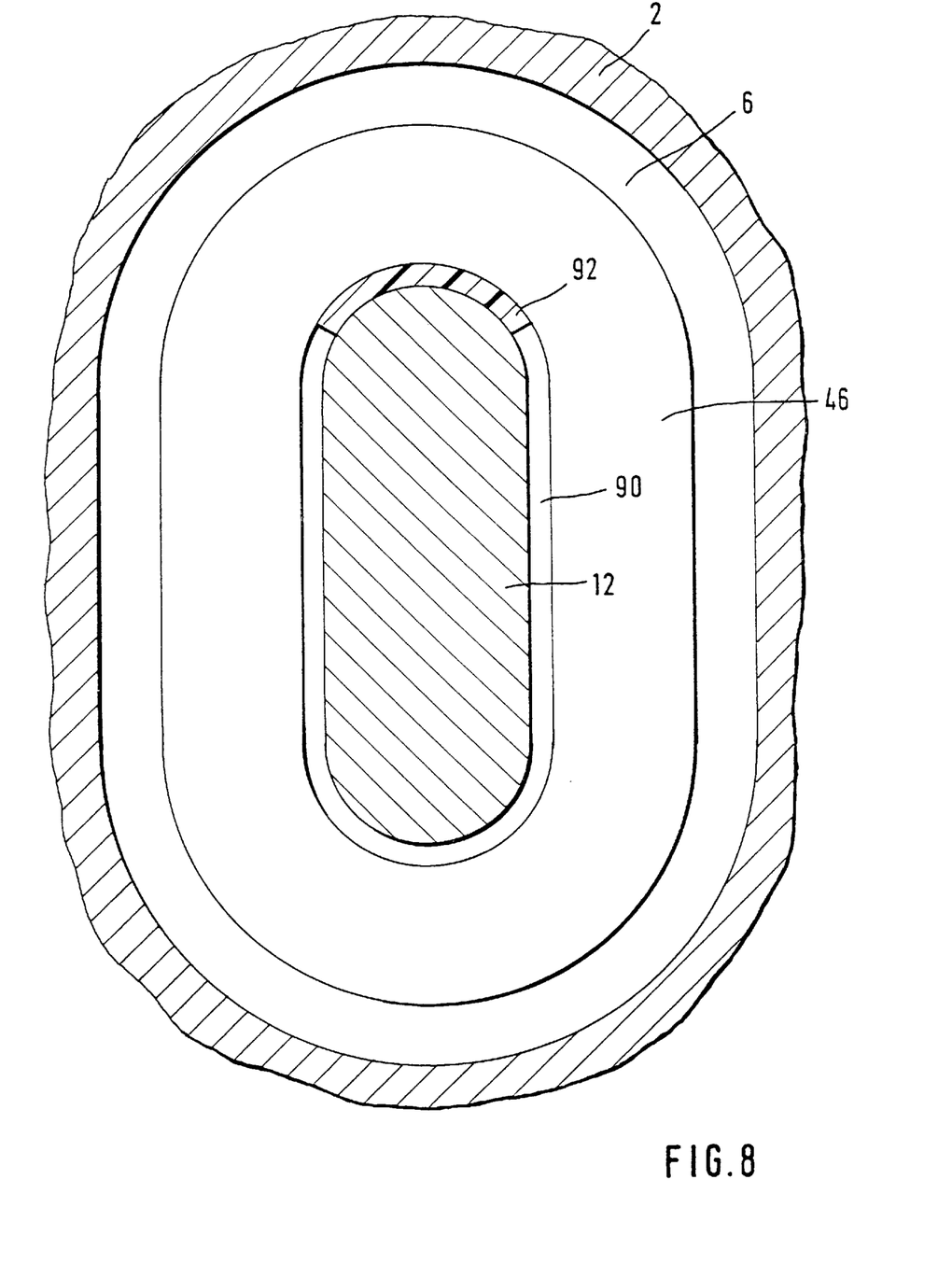

FIG. 8 shows a cross-section along the line A–A' in FIG. 1 at right angles to the axis through a sealing device when the lance 12 is inserted. It can be seen that the lance 12 and thus the opening in this case do not have a circular cross-section, but a non-circular cross-section. However, this is only one possible embodiment; the lance cross-section may, of course, also be circular.

The lance 12, which is introduced into the opening 90 in the inner casing 46 in such a way that a certain play exists between the lance 12 and the inner casing 46, can be seen in the centre of the arrangement. The chamber 6 which is limited inwards by the inner casing 46 and outwards by the outer casing 2, can also be seen in the outer area of the arrangement in FIG. 8.

The inner face of the opening 90 is coated in its upper area with a material 92, which has particularly good sliding properties. This material 92, with which the upper partial areas of the inner faces of the rings 20, 22 are also coated, reduces the friction of rings 20, 22 or the sealing element 14 on the lance and thus prevents rapid wear of the areas, which during centering of the rings 20, 22 or sealing element 14 on the lance 12 rest and slide to and fro on the latter.

We claim:

1. Device for sealing a lance (12) to an opening for leading the lance (12) into a container under pressure, which container comprises an outer casing (2) with an environment side end wall and a more internal side end wall, which end walls are provided with an opening for a lance (12) and said device including:

a sealing element (14) arranged in the outer casing (2), said sealing element (14) comprising an inner casing (46) with axial end walls provided with an opening for the lance as well as at least one packing (50) and at least one axially movable annular piston (52), which packaging and piston are arranged coaxially with an axis (24) of said inner casing (46) and inside said inner casing, said packing (50) being arranged between said piston (52) and one of said end walls of said inner casing (46) in an actuating direction of said piston (52), said packing 50 being compressable by actuation of said piston (52) axially against one of said end walls of said inner casing (46) whereby said packing (50) extends radially and forms a seal around an inserted lance (12), and said inner casing (46) being movable radially in the outer casing (2), so that said inner casing (46) together with said packing (50) and said piston (52) is self-centering on an inserted lance (12).

2. Sealing device according to claim 1, characterized in that said sealing element (14) comprises two pistons (52) and two packings (50), which are arranged coaxially with the said axis (24) of said inner casing (46), in that said two pistons (52) are arranged axially between said two packings (50), in that said two pistons act in opposite directions on actuation such that each of said packings (50) is compressed by a respective one of said pistons (52) against a respective one of said end walls of the inner casing (46).

3. Sealing device according to 1, characterized in that an elastic element (64), which is enclosed by said packing (50) and which at least partially reverses the axial deformation of said packing (50) when said piston (52) is not actuated, is mounted inside said at least one packing (50) concentrically with the axis (24) of said inner casing.

4. Sealing device according to claim 1, characterized in that annular flexible seals (48), which seal said inner casing (46) against the end walls of the outer casing (21), are provided on said end walls of said inner casing (46).

5. Sealing device according to claim 2, characterized in that an annular pressure chamber (58) is arranged between said two pistons (52).

6. Sealing device according to claim 2, characterized in that each of said pistons (52) is sealed with an inner annular seal (56) radially inwards against a guide sleeve (54) mounted coaxially with the axis (24) of said inner casing and is sealed radially outwards with an outer annular seal (56) against an inner face of said inner casing (46).

7. Sealing device according to claim 5, characterised in that an elastic seal (68), which seals the pressure chamber (58) from the outside, is arranged in the pressure chamber (58).

8. Sealing device according to claim 5, characterized in that said pistons (52) and inner casing are dimensioned and arranged such that said pistons are actuated by admission of a pressure medium to the pressure chamber (58).

9. Sealing device according to claim 2, further comprising elastic means (66, 72), for actuating said pistons (52), with said elastic means being arranged between said pistons.

10. Sealing device according to claim 2, further composing a radially movable, wedge-shaped piston actuation element (74) arranged between said pistons.

11. Sealing device according to claim 10, characterized in that said wedge-shaped element (74) is arranged so as to move radially inwards upon admission of a pressure medium to a chamber 6 between said inner and outer casing.

12. Sealing device according to claim 10, characterized in that there are a plurality of wedge-shaped elements positioned between multiple sets of pairs of said pistons and said sealing device further comprising elastic means (86) for exerting a force directed radially inward on said wedge-shaped elements (74) with said elastic means being arranged around said wedge-shaped elements (74).

13. Sealing device according to claim 12, characterized in that said elastic means (86) comprise a pretensioned spiral spring ring.

14. Sealing device according to claim 12, characterized in that said elastic means (86) comprises a pretentioned ring made from elastic plastic.

15. Sealing device according to claim 11 further comprising elastic means (82) arranged between a guide sleeve of said casing (2) positioned radially internally to said inner casing (54) and said wedge-shaped element (74).

16. Sealing device according to claim 1 further comprised supporting surfaces with which said inner casing (46) rests on the lance (12), said supporting surfaces being coated, or formed of a material (92), which reduces frictional resistance of said supporting surfaces making contact with an inserted lance 12.

17. A pressurizable container comprising a device for sealing a lance (12) to an opening for leading the lance (12) into said container when said container is under pressure, which container comprises an outer casing (2) with an environment side end wall and a more internal side end wall, which end walls are provided with an opening for a lance (12) and said device including:

a sealing element (14) arranged in said outer casing (2), said sealing element (14) comprising an inner casing (46) with axial end walls provided with an opening for the lance as well as at least one packing (50) and at least one axially movable annular piston (52), which packaging and piston are arranged coaxially with an axis (24) of said inner casing (46) and inside said inner casing, said packing (50) being arranged between said piston (52) and one of said end walls of said inner casing (46) in an actuating direction of said piston (52), said packing 50 being compressable by actuation of said piston (52) axially against one of said end walls of said inner casing (46) whereby said packing (50) extends radially and forms a seal around an inserted lance (12), and said inner casing (46) being movable radially in the outer casing (2), so that said inner casing (46) together with said packing (50) and said piston (52) is self-centering on an inserted lance (12).

18. Container according to claim 17 wherein said sealing element (14) comprises two pistons (52) and two packings (50), which are arranged coaxially with the axis (24) of said inner casing (46), in that said two pistons (52) are arranged axially between said two packings (50), and in that said two pistons act on opposite directions in actuation such that each of said packings (50) is compressed by a respective one of said pistons (52) against a respective one of said end walls of the inner casing (46).

19. A pressurizable container as recited in claim 18 wherein said pressurizable container is a furnace.

20. A pressurizable container as recited in claim 19 wherein said furnace is a shaft furnace.

* * * * *